United States Patent Office 3,495,896
Patented Feb. 17, 1970

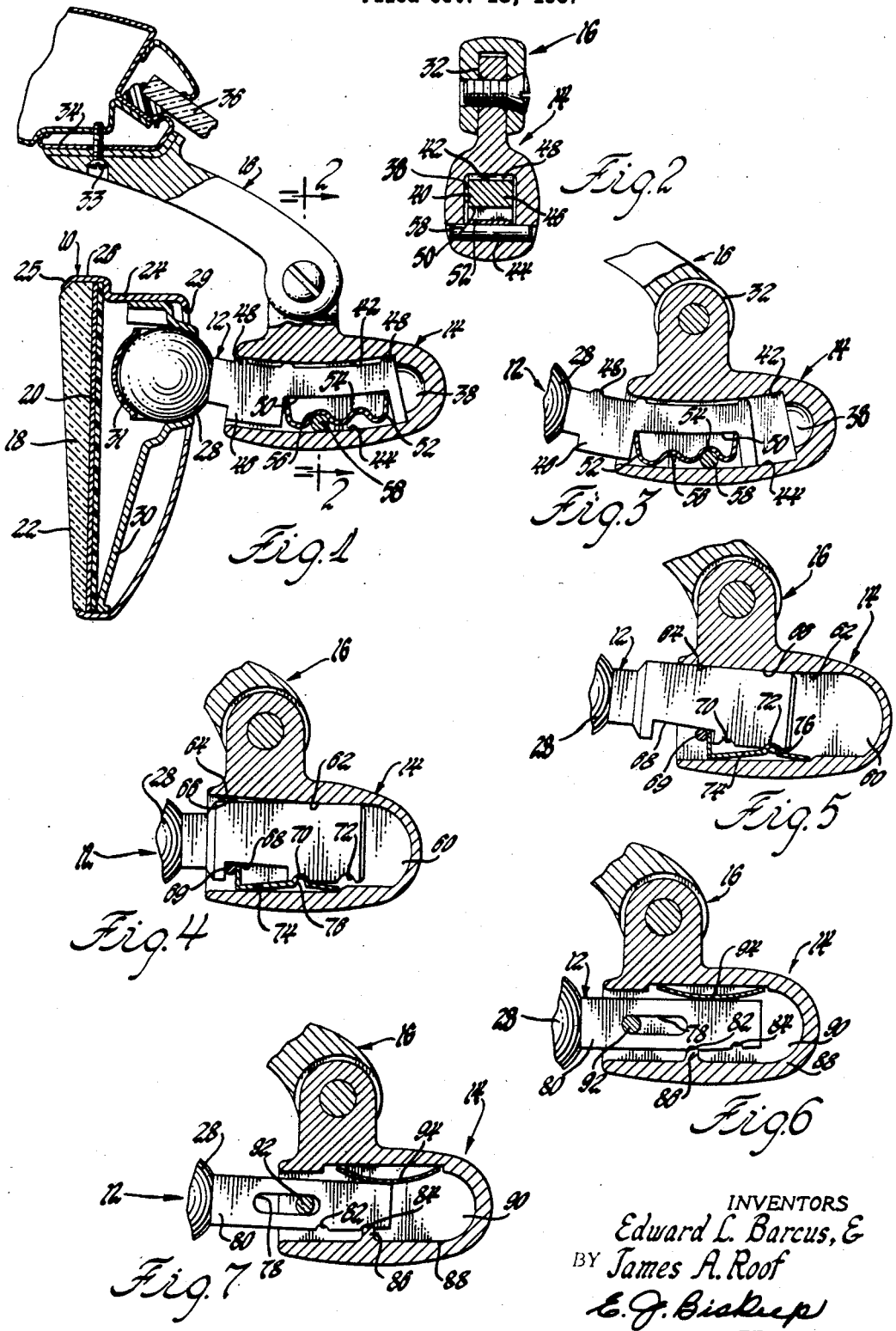

3,495,896
PUSH-PULL NONGLARE MIRROR
Edward L. Barcus and James A. Roof, Anderson, Ind., assignors to General Motors Corporation, Detroit, Mich., a corporation of Delaware
Filed Oct. 18, 1967, Ser. No. 676,115
Int. Cl. G02b 17/00
U.S. Cl. 350—281                               6 Claims

ABSTRACT OF THE DISCLOSURE

An anti-glare vehicle rear view mirror wherein a push-pull movement of the mirror casing shifts the mirror reflecting surfaces between spring-biased detent positions corresponding to the "day" and "night" mirror settings.

---

The anti-glare rear view mirrors of the prior art have principally used adjusting mechanisms contained within the mirror casing. By rotating a knob, shifting a lever or physically tilting the casing, the mirror element is switched from a "day" position to a "night" position or vice versa. Because such mechanisms are located interior of the mirror casing, the depth of the casing as well as the number of components parts is greater than in a comparably sized plane mirror assembly.

The anti-glare assembly of the present invention obviates these problems by locating the adjusting mechanism exterior of the mirror casing thereby permitting the use of a mirror element that differs from a plane mirror assembly only in the use of a prismoidal reflecting surface. This capability is provided by a spring biased detent arrangement contained within a cavity formed in the support shell of the mirror support bracket and cooperating with a rearward portion of the mirror stud so as to permit selective longitudinal adjustment of the mirror element between the "day" and "night" positions by a simple push-pull movement of the mirror casing. The shape of the cavity and the longitudinal spacing of the detents are interrelated so that the proper relative rotation of the mirror element with respect to the mounting bracket is achieved to shift the mirror reflecting surface between the "day" and "night" positions.

Accordingly, the objects of the present invention are: to provide an anti-glare vehicle rear view mirror assembly that is movable between a "day" and "night" viewing position by a simple push-pull movement of the mirror casing; to provide an anti-glare mirror assembly wherein the day-night adjusting mechanism is located exterior of the casing; to provide an anti-glare vehicle rear view mirror assembly wherein the rearward portion of the mirror support stud, received within a cavity formed in the support shell of the mirror support bracket, is shiftable between longitudinally spaced detent positions corresponding to "day" and "night" viewing positions; and, to provide an anti-glare vehicle rear view mirror assembly wherein a portion of the mirror support stud is shiftable longitudinally between spaced detent positions corresponding to the "day" and "night" positions so that the desired reflecting surface can be selected by a push-pull movement of the casing.

These and other objects of the present invention will be apparent to one skilled in the art upon reading the following detailed description, reference being made to the accompanying drawings in which:

FIGURE 1 is a side cross-sectional view of an anti-glare mirror assembly made in accordance with the present invention in the "day" position;

FIGURE 2 is a view taken along line 2—2 of FIGURE 1;

FIGURE 3 is a view corresponding to FIGURE 1 showing the mirror assembly in the "night" position;

FIGURE 4 is a partial cross-sectional view showing a modification of the assembly of FIGURE 1 in the "day" position;

FIGURE 5 is a view corresponding to FIGURE 4, showing the mirror assembly in the "night" position;

FIGURE 6 is a side cross-sectional view of another modification showing the mirror assembly in the "day" position; and FIGURE 7 is a view corresponding to FIGURE 6 showing the mirror assembly in the "night" position.

Referring to FIGURES 1 through 3 showing the preferred embodiment of the present invention, the rear view mirror assembly comprises a mirror assembly 10, a support stud 12, a support shell 14 and a mounting bracket 16. The mirror assembly 10 comprises a solid prismoidal mirror 18 having a highly reflective coating 20 substantially covering the rear surface thereof to provide a relatively intense image in the normal "day" position. The front surface 22 of the mirror 18 is less reflective than the rear surface to provide a front surface image reflection of reduced intensity when the mirror assembly 10 is in the non-glare "night" position. The mirror 18 is retained within the open front face of a dish-shaped sheet metal mirror casing 24 by an inturned crimped lip 25 of the peripheral casing flange 26. The spherical ball end 28 of the support stud 12 is inserted through an aperture 29 formed in the rear face of the casing 24 and retained within the casing cavity by a conventional mounting plate 30 and mounting strap 31 arrangement that frictionally engages the ball end 28 while permitting universal movement of the mirror assembly 10 relative to the support stud 12 and mounting bracket 16.

The mirror support shell 14 is a generally elongated bullet-shaped member that is fixedly connected to the lower end of the mounting bracket 16 by a tongue and groove arrangement 32. The upper end of the mirror support bracket 16 is adapted to be centrally attached, by means of screws 33 or other suitable fasteners, to the upper molding 34 of the vehicle adjacent the windshield 36. A longitudinally extending cavity 38 having an open end facing the mirror assembly 10 is centrally formed in the support shell 14. As seen in FIGURE 2, the cavity 38 has a generally rectangular cross section defined by laterally spaced side walls 40 and vertically spaced arcuate bearing surfaces 42 and 44. The rearward portion 46 of the support stud 12, also generally rectangular in cross section, is laterally and vertically retained within cavity 38. A plurality of transversely extending longitudinally spaced bearing ribs 48 are formed on the upper surface of portion 46 that frictionally and slidably engage the bearing surface 42 in assembly.

A transverse notch 50, formed in portion 46 and opening downwardly toward the lower bearing surface 44, retains a flat metallic spring 52 having W-shaped middle portions and reversely bent ends. The peaks and valleys of the spring 52 define longitudinally spaced spring detents 54 and 56. The spring 52 yieldingly engages a pin 58 extending transversely through the cavity 38 to bias the ribs 48 into frictional engagement with bearing surface 42. As shown in FIGURES 1 and 3, when the pin 58 engages detent 56, the mirror 18 is in the "day" position and when pin 58 engages detent 54, the mirror is in the "night" position. The curvature of the upper bearing surface 42 establishes a transverse axis about which ball end 28 rotates relative to the mounting bracket 16 when the mirror assembly 10 is longitudinally shifted between the detent positions. It will be appreciated that the spacing of the detents and the curvature of the bearing surface 42 can be selected so that the mirror assembly 10 is relatively rotated to expose the desired reflecting surface for viewing.

A modification of the above-described mirror assembly is shown in FIGURES 4 and 5 wherein the cavity 60 of the support shell 14 has an upper bearing surface including a rearward substantially horizontal portion 62 and an inclined portion 64. The inclination of portion 64 with respect to portion 62 is equal to the angle through which ball end 28 must rotate to move mirror assembly 10 from the "day" to "night" position. The rearward portion of the support stud includes a substantially flat upper surface 66 and a lower surface comprising a transversely extending ramp notch 68 and longitudinally spaced detent grooves 70 and 72. The notch 68 is inclined relative to surface 62 to the same extent as portion 64 is inclined with respect to surface 62. A pin 69 extends transversely through the cavity 60 and in the "day" position shown in FIGURE 4 engages the forward end surface of the notch 68. A metallic spring member 74 has a reversely bent end that engages the pin 69 and a detent rib 76 formed in its mid-portion that engages detent groove 70 in the "day" position. As seen in FIGURE 5, when the mirror support stud 12 is longitudinally shifted, the inclined surface of notch 68 slides along pin 69 until the detent rib 76 engages the detent groove 72. At this position, the spring member 74 biases surface 66 into frictional engagement with the inclined bearing surface 64 thereby establishing the anti-glare "night" position. Because of the parallel inclination of portion 64 and notch 68, the mirror assembly 10 is rotated from the "day" to the "night" viewing positions.

A further modification is shown in FIGURES 6 and 7 wherein a transverse longitudinal slot 78 is formed in the midportion of a rearward part 80 of the mirror support stud 12. Longitudinally spaced detent grooves 82 and 84, formed on the lower surface of rearward part 80, are spring biased into engagement with a detent projection 86 formed on the lower surface 88 of the mirror body cavity 90 by means of a spring member 94. A pin 92 extends transversely through the cavity 90 and slot 78, and it will be noted that, as the mirror support stud 12 is longitudinally shifted between detent position 82 to 84, the ball end 28 is rotated relative to the flange 16 in the manner previously described. The depths of the detents 82 and 84 are relatively sized to accomplish this rotation.

It will be noted that in each of the above-mentioned modifications, by merely varying the portion of the mirror support stud from a fixed construction to a longitudinally slidable construction and substituting a prismoidal mirror element 18 for a plane mirror, a conventional mirror assembly can be changed to an anti-glare assembly with a minimum amount of structural modifications.

Since other changes and modifications will be apparent to one skilled in the art, the scope of the invention, as defined by the appended claims, is intended to cover such alterations of the illustrative embodiment.

What is claimed is:

1. An anti-glare rear view mirror comprising: a support member adapted to be attached at one end to the vehicle and having a longitudinally extending aperture formed at the other end, a mirror element having two reflecting surfaces of different reflective powers, a support stud having a first portion universally connected to the mirror element and a second portion adapted to slide longitudinally within said aperture such that said mirror element and said first portion pivot relative to said support member, spring means biasing the second portion of the support stud into frictional engagement with the support member, and detent means providing two longitudinally spaced detent positions operatively connected to the second portion of the support member and the support stud and establishing two relatively rotated positions for said mirror element, said support stud being longitudinally slidable within said aperture between one of said rotated positions wherein one of said reflecting surfaces is presented for viewing and the other of said rotated positions wherein the other of said reflecting surfaces is presented for viewing.

2. An anti-glare vehicle rear view mirror comprising; a support member adapted to be attached to the vehicle, a mirror element having two reflecting surfaces of different reflective powers, a support stud having a first portion universally connected to the mirror element, a longitudinally extending aperture formed in a portion of the support member and defining vertically spaced arcuate bearing surfaces, a second portion of the support stud received within said aperture, a plurality of bearing ribs formed on said second portion engaging one of said arcuate bearing surfaces, a transverse notch formed in said second portion opening toward the other of said arcuate bearing surfaces, spring means received within said notch, a pair of longitudinally spaced detent positions formed in said spring means, a detent member extending transversely across said aperture adjacent said spring member, said detent member engageable in either of said detent positions and cooperating with the spring means to bias said bearing ribs into sliding engagement with said one of said arcuate bearing surfaces, whereby said mirror element is longitudinally slidable in an arcuate path defined by said bearing surfaces between one of said detent positions wherein one of said reflecting surfaces is presented for viewing and the other of said detent positions wherein the other of said reflecting surfaces is presented for viewing.

3. An anti-glare vehicle rear view mirror comprising; a support member adapted to be attached to the vehicle, a mirror element having two reflecting surfaces of different reflective powers, a support stud having a first portion universally connected to the mirror element, a longitudinally extending aperture having vertically spaced surfaces formed in a portion of the support member, a detent projection formed in one of the surfaces, a second portion of the support stud received with said aperture and having a longitudinally extending transverse slot formed therein, a pin connected to the support member and extending transversely through said aperture and said slot, two longitudinally spaced detent means formed in the second portion of the support member engageable with said detent projection and establishing relatively rotated positions for said mirror element, spring means biasing the second portion of the support stud into frictional engagement with the detent projection, said support stud being longitudinally slidable within said aperture between one of said rotated positions wherein one of said reflecting surfaces is presented for viewing and the other of said rotated positions wherein the other of said reflecting surfaces is presented for viewing.

4. An anti-glare vehicle rear view mirror comprising; a support member adapted to be attached to the vehicle, a mirror element having two reflecting surfaces of different reflective powers, a support stud having a first portion universally connected to the mirror element, a longitudinally extending aperture having upper and lower vertically spaced surfaces formed in a portion of the support member, said upper vertically spaced surface including mutually inclined bearing portions, a second portion of the support stud received within said aperture having a substantially flat upper bearing surface and a bottom surface including an inclined ramp portion, said ramp portion inclined with respect to said flat upper bearing surface to the same extent as the inclination between said mutually inclined bearing portions, a pin connected to the support member extending transversely through said aperture and engaging said ramp portion of said second portion of the support stud, two longitudinally spaced detents formed in the bottom surface of the second portion of the support stud, spring means biasing the second portion of the support stud into frictional engagement with said upper vertically spaced surface whereby said support stud is manually longitudinally slidable between one of said detent positions wherein one of said reflecting surfaces is presented for viewing and the other of said detent positions wherein the other of said reflecting surfaces is presented for viewing.

5. An anti-glare vehicle rear view mirror comprising; a mounted bracket adapted to be attached at one end to the vehicle, a mirror assembly having a casing supporting a mirror having two surfaces of different reflective powers, a support stud having one end thereof mounted in said casing and providing for universal adjustment of the mirror assembly, the free end of the support stud being telescopingly supported by the free end of the mounting bracket, one of said free ends having an elongated aperture formed therein, the other of said free ends adapted to be received within said aperture for relative longitudinal and pivotal movement, spring means located within said aperture and biasing said free ends into frictional engagement with each other, and means rigid with one of said free ends and cooperating with the other of said free ends for providing two longitudinally spaced detent positions which established two relatively rotated positions for said mirror assembly whereby manual movement of said casing along a longitudinal axis between said relatively rotated positions causes one or the other of said reflecting surfaces to be presented for viewing.

6. An anti-glare vehicle rear view mirror comprising; a mounting bracket adopted to be attached at one end to the vehicle, a mirror assembly having a casing supporting a mirror having two surfaces of different reflective powers, a support stud having one end thereof mounted in said casing and providing for universal adjustment of the mirror assembly, the free end of the support stud being telescopingly supported by the free end of the mounting bracket, one of said free ends having an elongated aperture formed therein, the other of said free ends adapted to be received within said aperture for relative longitudinal and pivotal movement, spring means located within said aperture and biasing said free ends into frictional engagement with each other, and means rigid with one of said free ends and cooperating with means carried by the other of said free ends for providing two longitudinally spaced detent positions which establish two relatively rotated positions for said mirror assembly whereby manual movement of said casing along a longitudinal axis between said relatively rotated positions causes one or the other of said reflecting surfaces to be presented for viewing.

References Cited

UNITED STATES PATENTS

| 2,107,845 | 2/1938 | Albert | 248—299 |
| 1,808,740 | 6/1931 | Wetherbee | 350—280 |
| 2,415,939 | 2/1947 | Donor | 248—299 |
| 2,717,531 | 9/1955 | Schenck | 248—299 X |
| 3,249,388 | 5/1966 | Jennings | 248—279 X |
| 2,964,351 | 12/1960 | White | 248—299 X |
| 1,868,031 | 7/1932 | Sudbrink | 350—276 |
| 1,919,475 | 7/1933 | McKinley | 350—280 |
| 2,420,259 | 5/1947 | McNamara | 350—280 |
| 2,631,498 | 3/1953 | Barkley | 350—281 |

FOREIGN PATENTS

| 1,419,424 | 10/1965 | France. |
| 708,349 | 5/1954 | Great Britain. |

PAUL R. GILLIAM, Primary Examiner

U.S. Cl. X.R.

248—477; 350—279